United States Patent [19]

Crapiz

[11] Patent Number: 4,787,202
[45] Date of Patent: Nov. 29, 1988

[54] COMBUSTION CHAMBER FOR ROCKET MOTOR AND ITS ASSEMBLING METHOD

[75] Inventor: Dino Crapiz, Le Haillan, France

[73] Assignee: Societe Europeenne de Propulsion, Suresnes, France

[21] Appl. No.: 5,647

[22] Filed: Jan. 21, 1987

[30] Foreign Application Priority Data

Jan. 22, 1986 [FR] France ................. 86 00877

[51] Int. Cl.[4] .............................................. F02K 9/08
[52] U.S. Cl. ............................................ 60/253; 60/909
[58] Field of Search .................... 60/253, 255, 909; 156/169, 173, 175; 220/414; 285/332, 915

[56] References Cited

U.S. PATENT DOCUMENTS

| | | | |
|---|---|---|---|
| 3,173,249 | 3/1965 | Wiggins | 60/253 |
| 3,243,956 | 4/1966 | Hamm et al. | 60/255 |
| 3,296,802 | 1/1967 | Williams | 60/253 |
| 3,812,671 | 5/1974 | Burr et al. | 60/253 |

FOREIGN PATENT DOCUMENTS

| | | |
|---|---|---|
| 1209364 | 1/1966 | Fed. Rep. of Germany ........ 60/253 |
| 2045201 | 6/1969 | France . |
| 2340490 | 5/1973 | France . |
| 471321 | 4/1969 | Switzerland . |

*Primary Examiner*—Louis J. Casaregola
*Assistant Examiner*—Timothy S. Thorpe
*Attorney, Agent, or Firm*—Scully, Scott, Murphy & Presser

[57] ABSTRACT

Combustion chamber for rocket motor of the type comprising two domes, interconnected by a cylindrical shell, each of said domes and the intermediate shell being produced from a filamentary composite material, in which each dome comprises a slightly conical skirt of which the external face is joined over at least part of its length to the inner face of the shell, via a split cylindro-conical connection ring and at least opposite the conical skirt of the dome, one conical face having the same conicity as the conical skirt, the assembling of the three elements to be connected, i.e. dome, shell and ring, being achieved by adhesive bonding.

5 Claims, 1 Drawing Sheet

COMBUSTION CHAMBER FOR ROCKET MOTOR AND ITS ASSEMBLING METHOD

The present invention relates to a combustion chamber for a rocket motor of the type comprising two domes, if necessary partly perforated, and interconnected by a cylindrical shell.

It has already been proposed to produce the domes and the intermediate shell from a filamentary composite material such as a carbon/epoxy resin type composite, the winding of the cylindrical shell being carried out separately from that of the domes. In this case, the shell is produced on already wound domes or on a propellant grain already equipped with the domes and acting as a mandrel.

Although this procedure offers a number of advantages, for example as regards bending stiffness, and circumferential stiffness of the shell, it does not however permit the realization of constructions showing a good resistance to high kinetic heating. Indeed, for this particular type of combustion chamber, the necessity to ensure thermal compatibility with the propellant material implies a relatively low temperature of polymerization of the resin, which limits the resistance to high kinetic heating. Another disadvantage of the known combustion chamber resides in the fact that its construction does not permit the positioning and fastening of a dome anywhere on the inner face of the shell. Moreover, when using the propellant grain as a mandrel for producing the sleeve in filamentary composite, the dangerous part of the manufacture of the combustion chamber is that which takes place in the presence of the propellant, and lasts throughout the winding and the polymerization of the shell.

It is an object of the present invention to eliminate the aforesaid disadvantages while preserving the advantages of the prior art.

This object is reached according to the invention due to the fact that each dome comprises a slightly conical skirt of which the external face is joined over at least part of its length to the inner face of the shell, via a split cylindro-conical connection ring and at least opposite the conical skirt of the dome, one conical face having the same conicity as the conical skirt, the assembling of the three elements to be connected, i.e. dome, shell and ring, being achieved by adhesive bonding.

As a result of this construction, the different constituent elements can undergo heat treatments without it being necessary to account for the reactive behavior of the contents of the combustion chamber. Moreover, the construction according to the invention permits a considerable reduction of the extent of the anchoring or joining zones by which the domes are fixed onto the shell, and by way of consequence, an increase of the volume available to be filled by the propellant.

The invention also relates to a method for assembling the combustion chamber of a rocket motor comprising a cylindrical shell and separate domes, all produced by winding a filamentary composite material with a resin-type matrix.

According to the invention, said method is characterized in that it consists in first producing separately the shell, the domes with their two conical skirts, and two cylindro-conical connection rings, in polymerizing the resin of these elements before assembling them, then in coating with an adhesive material, the inside part of the shell which will receive a dome, the external face of the dome and/or the conical face and the cylindrical face of the cylindro-conical ring, in placing the dome in the part of the sleeve provided to this effect, and while said dome is held in position, introducing the cylindro-conical ring into the space between the shell and the conical skirt of the dome until the ring reaches to and presses against the dome, then in proceeding to the polymerization of the adhesive.

It will be easily understood that this method makes it possible not only to produce all the elements of the combustion chamber separately, taking into account the conditions to be met by each element, but also, to readily fill the combustion chamber with the propellant by pouring same through maximum openings equal to the inner diameter of the shell, and to increase the security of production since the time required for assembling the elements in the presence of the propellant is reduced to the time needed to fix the domes in the shell.

The invention will be more readily understood on reading the following description with reference to the accompanying drawings in which.

Figure 1:
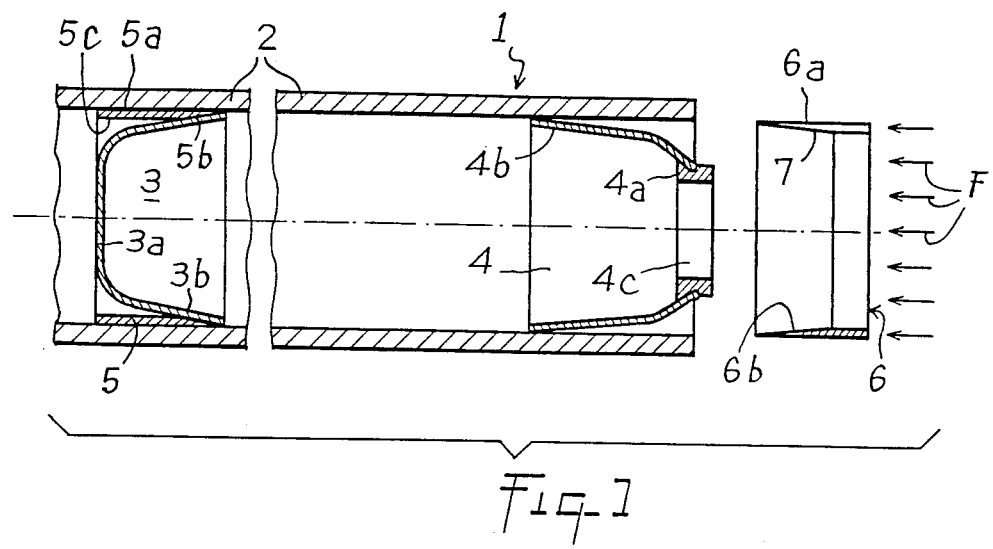
FIG. 1 is an elevational view of an axial section through the combustion chamber during the assembling operation.
Figures 2, 3:
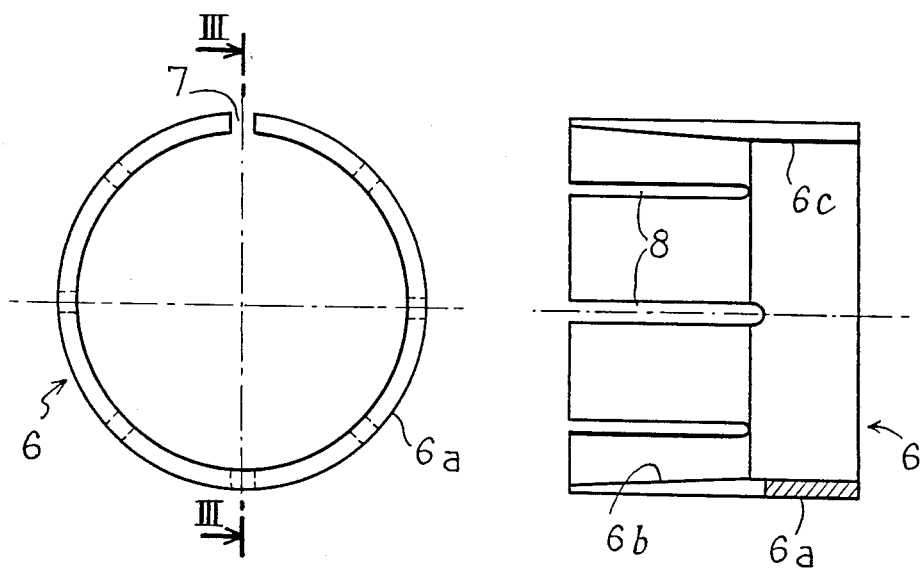
FIG. 2 is a front view of the cylindro-conical connection ring.
FIG. 3 is an elevational view of an axial section through the connection ring along line III—III of FIG. 2.

Referring now to FIG. 1, the combustion chamber 1 of a rocket motor comprises a cylindrical shell 2, at least two domes 3, 4 and a connection ring 5, 6 for each dome 3, 4.

The cylindrical shell 2 and the separate domes 3, 4 are produced separately in a wound filamentary composite material, such as for example, of the carbon/epoxy resin type, and are hot-polymerized at a temperature which may rise above the propellant self-igniting temperature. Each dome 3, 4 comprises a solid $3a$ or perforated $4a$ polar sitting extended by a conical skirt $3b$, $4b$ having a conicity between 0.2° and 5° (equal to the cone half-angle). The maximum external diameter of the dome 3, 4, i.e. the external diameter of the large base of the conical skirt $3b$, $4b$ is slightly less or at the most equal to the internal diameter of the cylindrical shell 2. The dome, for example 4, may if need be, be made up of two different parts, and have a conical skirt $4b$ joined to a polar sitting $4a$ provided with one or more apertures $4c$.

Connection ring 5, 6 has a cylindro-conical shape and is provided with at least one separating slot 7. If only one slot 7 is provided, said slot advantageously extends throughout the length of the ring 5, 6. The outer periphery $5a$, $6a$ of split ring 5, 6 which is intended to contact the inner face of the shell 2 has a cylindrical shape throughout the length of the ring whereas the internal periphery of the ring 5, 6 comprises at least one conical part $5b$, $6b$ widening towards the internal end of the ring. Conical face $5b$, of the ring 5, 6 has the same conicity as the outer face of conical skirt $3b$, $4b$ of dome 3, 4, and therefore, it is also between 0.2° and 5° (equal to the cone half-angle). On the outside, connection ring 5, 6 may be provided on its inner face with a cylindrical part $5c$, $6c$ which is connected with conical part $5b$, $6b$.

The length of the conical part of ring 5, 6 is generally comprised between 0.5 and 1.5 times the diameter of said ring. Connection ring 5, 6 is produced by winding a filamentary composite material such as a glass/epoxy resin type material, polymerization of the resin being carried out with heat, at a temperature which may be above the propellant self-ignition temperature.

The cylindro-conical connection ring 5, 6 may comprise a plurality of slots 8 in lieu of or in complement to the one separation slot 7. In this case, slots 8 are distributed preferably uniformly over the whole periphery of the ring 5, 6, starting from the thinner end thereof and traversing, in parallel to the axis of the ring 5, 6, at least all the conical part 5b, 6b thereof. It should be noted that the external perimeter of the split ring 5, 6, when the edges of the slots 7 or 8 are contacting together, is less by 0.2 to 5 mm than the internal perimeter of the cylindrical sleeve 2.

Assembly of the different elements constituting the combustion chamber is preferably as follows:

(a) The external surface of the conical skirt 3b, 4b of the dome 3, 4 and the internal surface of the shell 2 are coated with an adhesive (such as epoxy resin) in those areas where the assembly is to take place, such areas not being necessarily at the ends of the shell 2.

(b) Each dome 3, 4 is introduced, positioned and held in its final position inside shell 2 by means of a centering tool, not shown.

It is noted that steps (a) and (b) can be reversed. In other words, the surfaces of the sleeve 2 and of the corresponding skirt 3b, 4b which are in facing relationship, can be coated with the adhesive after the positioning of domes 3, 4 in said shell 2.

(c) The split cylindro-conical ring 5, 6 is coated with adhesive on its outer faces 5a, 6a and on its inner faces in the conical part 5b, 6b.

(d) The adhesive-coated ring is thereafter inserted into the space between the conical skirt 3b, 4b and the inner face of the shell, a thrust F being applied onto the external end of the ring until the required crimping degree is reached.

(e) The assembly is held in position during the polymerization of the adhesive, which can be carried out in cold or hot conditions, depending on the adhesive used.

(f) The holding tools are withdrawn and any excess of adhesive is removed.

The propellant may be introduced in the combustion chamber either after the positioning of the first dome, for example dome 3, and before that of the second dome 4, or after the positioning of the two domes 3, 4 provided that one of them, for example dome 4, is perforated.

Two combustion chambers have been produced with the method according to the invention with:

one shell 2 constituted of a wound filamentary carbon/epoxy resin composite material of inner diameter 158 mm, of length 1,700 mm and of thickness 4 mm, two domes 3, 4 constituted of a wound filamentary carbon/epoxy resin material and comprising skirts 3b, 4b of 1° conicity, two cylindro-conical split rings 5, 6 constituted of a wound filamentary glass/epoxy resin composite material having a 1° conicity on the internal conical face 5b, 6b, an epoxy resin adhesive.

After assembly, the adhesive was hot-polymerized. Two hydraulic burst tests were performed at 344 and 346 bars, respectively, without any damage to the dome-shell-ring connection, up to breaking point at the level of the joining coil with the polar sitting. In the first case the length of ring 5,6 was 170 mm and in the second case, it was 150 mm whereas the anchored-in length of the dome (part of the dome in contact with the sleeve and/or the ring) into the sleeve was 200 and 110 mm respectively. This shows that the length of the anchoring zones can be reduced quite considerably whereas at the same time the combustion chamber filling rate is increased.

What is claimed is:

1. Combustion chamber for rocket motor of the type comprising two domes, interconnected by a cylindrical shell, each of said domes and the intermediate shell being produced from a filamentary composite material, wherein each dome comprises a conical skirt section of which the external face is joined over at least part of its length to the inner face of the shell, via a split cylindro-conical connection ring, each of said rings having a substantially cylindrical outer surface and an inner surface of which at the portion of the length opposite said conical skirt section is substantially conical in shape, thus forming at the extremities of said rings a thinner end and a thicker end respectively, said cylindrical outer surface and said inner surface of said rings having a common central axis, the conicity of the conical portion of the inner surface of said rings being equal to the conicity of the conical skirt section, said rings being situated in the assembled combustion chamber between the inner face of said cylindrical shell and the conical skirt section of said domes the dome, shell and ring being secured together by adhesive bonding.

2. Combustion chamber as claimed in claim 1, wherein the conicity of the conical skirt of each of said domes and that of the conical portion of the inner surface of each of said connection rings is between 0.2° and 5° (cone half-angle).

3. Combustion chamber as claimed in claim 1, wherein each of said connection rings comprises at least one separation slot extending from said thicker end to said thinner end.

4. Combustion chamber as claimed in claim 1, wherein each of said connection rings comprises a plurality of slots starting from the thinner end of said rings and traversing, in parallel to the axis of said rings, at least the conical portion of the inner surface of said rings.

5. Combustion chamber as claimed in either claim 3 or 4, wherein the circumference of the outer cylindrical surface of said connection rings, when the edges of the slots are contacting, is less by 0.2 to 5 mm than the circumference of the inner face of said cylindrical shell.

* * * * *